Figure 2:
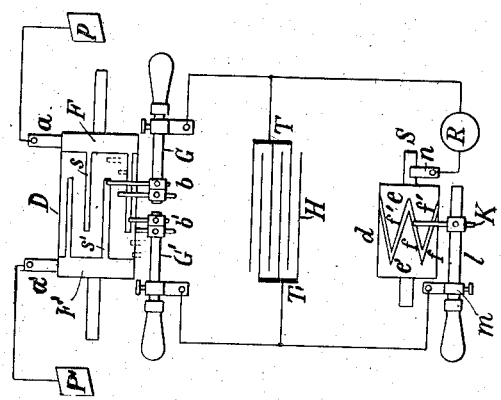

No. 787,412. PATENTED APR. 18, 1905.
N. TESLA.
ART OF TRANSMITTING ELECTRICAL ENERGY THROUGH THE NATURAL MEDIUMS.
APPLICATION FILED MAY 16, 1900. RENEWED JUNE 17, 1902.

Witnesses:
Raphaël Netter
M. Lawson Dyer

Nikola Tesla, Inventor
by Kerr, Page & Cooper, Att'ys

No. 787,412.

Patented April 18, 1905.

UNITED STATES PATENT OFFICE.

NIKOLA TESLA, OF NEW YORK, N. Y.

ART OF TRANSMITTING ELECTRICAL ENERGY THROUGH THE NATURAL MEDIUMS.

SPECIFICATION forming part of Letters Patent No. 787,412, dated April 18, 1905.

Application filed May 16, 1900. Renewed June 17, 1902. Serial No. 112,034.

*To all whom it may concern:*

Be it known that I, NIKOLA TESLA, a citizen of the United States, residing in the borough of Manhattan, in the city, county, and State of New York, have discovered a new and useful Improvement in the Art of Transmitting Electrical Energy Through the Natural Media, of which the following is a specification, reference being had to the drawings accompanying and forming a part of the same.

It is known since a long time that electric currents may be propagated through the earth, and this knowledge has been utilized in many ways in the transmission of signals and the operation of a variety of receiving devices remote from the source of energy, mainly with the object of dispensing with a return conducting-wire. It is also known that electrical disturbances may be transmitted through portions of the earth by grounding only one of the poles of the source, and this fact I have made use of in systems which I have devised for the purposes of transmitting through the natural media intelligible signals or power and which are now familiar; but all experiments and observations heretofore made have tended to confirm the opinion held by the majority of scientific men that the earth, owing to its immense extent, although possessing conducting properties, does not behave in the manner of a conductor of limited dimensions with respect to the disturbances produced, but, on the contrary, much like a vast reservoir or ocean, which while it may be locally disturbed by a commotion of some kind remains unresponsive and quiescent in a large part or as a whole. Still another fact now of common knowledge is that when electrical waves or oscillations are impressed upon such a conducting-path as a metallic wire reflection takes place under certain conditions from the ends of the wire, and in consequence of the interference of the impressed and reflected oscillations the phenomenon of "stationary waves" with maxima and minima in definite fixed positions is produced. In any case the existence of these waves indicates that some of the outgoing waves have reached the boundaries of the conducting-path and have been reflected from the same. Now I have discovered that notwithstanding its vast dimensions and contrary to all observations heretofore made the terrestrial globe may in a large part or as a whole behave toward disturbances impressed upon it in the same manner as a conductor of limited size, this fact being demonstrated by novel phenomena, which I shall hereinafter describe.

In the course of certain investigations which I carried on for the purpose of studying the effects of lightning discharges upon the electrical condition of the earth I observed that sensitive receiving instruments arranged so as to be capable of responding to electrical disturbances created by the discharges at times failed to respond when they should have done so, and upon inquiring into the causes of this unexpected behavior I discovered it to be due to the character of the electrical waves which were produced in the earth by the lightning discharges and which had nodal regions following at definite distances the shifting source of the disturbances. From data obtained in a large number of observations of the maxima and minima of these waves I found their length to vary approximately from twenty-five to seventy kilometers, and these results and certain theoretical deductions led me to the conclusion that waves of this kind may be propagated in all directions over the globe and that they may be of still more widely differing lengths, the extreme limits being imposed by the physical dimensions and properties of the earth. Recognizing in the existence of these waves an unmistakable evidence that the disturbances created had been conducted from their origin to the most remote portions of the globe and had been thence reflected, I conceived the idea of producing such waves in the earth by artificial means with the object of utilizing them for many useful purposes for which they are or might be found applicable. This problem was rendered extremely difficult owing to the immense dimensions of the planet, and consequently enormous movement of electricity or rate at which electrical energy had to be delivered in order to approximate, even in a remote degree, movements or rates which are manifestly attained in the displays of electrical forces in nature and which seemed at first unrealizable by any human agencies; but by gradual and continuous improvements of a generator of electrical oscillations, which I have described in my Patents Nos. 645,576 and 649,621, I finally succeeded in reaching electrical movements or rates of delivery of electrical energy not only approximating, but, as shown in many comparative tests and measurements, actually surpassing those of lightning discharges, and by means of this apparatus I have found it possible to reproduce whenever desired phenomena in the earth the same as or similar to those due to such discharges. With the knowledge of the phenomena discovered by me and the means at command for accomplishing these results I am enabled not only to carry out many operations by the use of known instruments, but also to offer a solution for many important problems involving the operation or control of remote devices which for want of this knowledge and the absence of these means have heretofore been entirely impossible. For example, by the use of such a generator of stationary waves and receiving apparatus properly placed and adjusted in any other locality, however remote, it is practicable to transmit intelligible signals or to control or actuate at will any one or all of such apparatus for many other important and valuable purposes, as for indicating wherever desired the correct time of an observatory or for ascertaining the relative position of a body or distance of the same with reference to a given point or for determining the course of a moving object, such as a vessel at sea, the distance traversed by the same or its speed, or for producing many other useful effects at a distance dependent on the intensity, wave length, direction or velocity of movement, or other feature or property of disturbances of this character.

I shall typically illustrate the manner of applying my discovery by describing one of the specific uses of the same—namely, the transmission of intelligible signals or messages between distant points—and with this object reference is now made to the accompanying drawings, in which—

Figure 1:
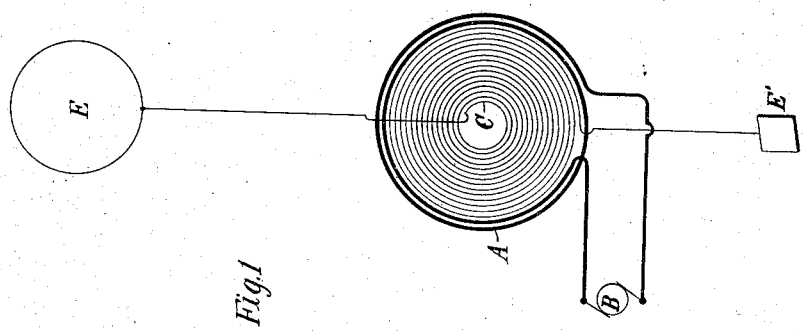

Figure 1 represents diagrammatically the generator which produces stationary waves in the earth, and Fig. 2 an apparatus situated in a remote locality for recording the effects of these waves.

In Fig. 1, A designates a primary coil forming part of a transformer and consisting generally of a few turns of a stout cable of inappreciable resistance, the ends of which are connected to the terminals of a source of powerful electrical oscillations, diagrammatically represented by B. This source is usually a condenser charged to a high potential and discharged in rapid succession through the primary, as in a type of transformer invented by me and not well known; but when it is desired to produce stationary waves of great lengths an alternating dynamo of suitable construction may be used to energize the primary A. C is a spirally-wound secondary coil within the primary having the end nearer to the latter connected to the ground E' and the other end to an elevated terminal E. The physical constants of coil C, determining its period of vibration, are so chosen and adjusted that the secondary system E' C E is in the closest possible resonance with the oscillations impressed upon it by the primary A. It is, moreover, of the greatest importance in order to still further enhance the rise of pressure and to increase the electrical movement in the secondary system that its resistance be as small as practicable and its self-induction as large as possible under the conditions imposed. The ground should be made with great care, with the object of reducing its resistance. Instead of being directly grounded, as indicated, the coil C may be joined in series or otherwise to the primary A, in which case the latter will be connected to the plate E'; but be it that none or a part or all of the primary or exciting turns are included in the coil C the total length of the conductor from the ground-plate E' to the elevated terminal E should be equal to one-quarter of the wave length of the electrical disturbance in the system E' C E or else equal to that length multiplied by an odd number. This relation being observed, the terminal E will be made to coincide with the points of maximum pressure in the secondary or excited circuit, and the greatest flow of electricity will take place in the same. In order to magnify the electrical movement in the secondary as much as possible, it is essential that its inductive connection with the primary A should not be very intimate, as in ordinary transformers, but loose, so as to permit free oscillation—that is to say, their mutual induction should be small. The spiral form of coil C secures this advantage, while the turns near the primary A are subjected to a strong inductive action and develop a high initial electromotive force. These adjustments and relations being carefully completed and other constructive features indicated rigorously observed, the electrical movement produced in the secondary system by the inductive action of the primary A will be enormously magnified, the increase being directly proportionate to the inductance and frequency and inversely to the resistance of the secondary system. I have found it practicable to produce in this manner an electrical movement thousands of times greater than the initial—that is, the one impressed upon the secondary by the primary A—and I have thus reached activities or rates of flow of electrical energy in the system E' C E measured by many tens of thousands of horsepower. Such immense movements of electricity give rise to a variety of novel and striking phenomena, among which are those already described. The powerful electrical oscillations in the system E' C E being communicated to the ground cause corresponding vibrations to be propagated to distant parts of the globe, whence they are reflected and by interference with the outgoing vibrations produce stationary waves the crests and hollows of which lie in parallel circles relatively to which the ground-plate E' may be considered to be the pole. Stated otherwise, the terrestrial conductor is thrown into resonance with the oscillations impressed upon it just like a wire. More than this, a number of facts ascertained by me clearly show that the movement of electricity through it follows certain laws with nearly mathematical rigor. For the present it will be sufficient to state that the planet behaves like a perfectly smooth or polished conductor of inappreciable resistance with capacity and self induction uniformly distributed along the axis of symmetry of wave propagation and transmitting slow electrical oscillations without sensible distortion and attenuation.

Besides the above three requirements seem to be essential to the establishment of the resonating condition.

First. The earth's diameter passing through the pole should be an odd multiple of the quarter wave length—that is, of the ratio between the velocity of light—and four times the frequency of the currents.

Second. It is necessary to employ oscillations in which the rate of radiation of energy into space in the form of hertzian or electromagnetic waves is very small. To give an idea, I would say that the frequency should be smaller than twenty thousand per second, though shorter waves might be practicable. The lowest frequency would appear to be six per second, in which case there will be but one node, at or near the ground-plate. and, paradoxical as it may seem, the effect will increase with the distance and will be greatest in a region diametrically opposite the transmitter. With oscillations still slower the earth, strictly speaking, will not resonate, but simply act as a capacity, and the variation of potential will be more or less uniform over its entire surface.

Third. The most essential requirement is, however, that irrespective of frequency the wave or wave-train should continue for a certain interval of time, which I have estimated to be not less than one-twelfth or probably 0.08484 of a second and which is taken in passing to and returning from the region diametrically opposite the pole over the earth's surface with a mean velocity of about four hundred and seventy-one thousand two hundred and forty kilometers per second.

The presence of the stationary waves may be detected in many ways. For instance, a circuit may be connected directly or inductively to the ground and to an elevated terminal and tuned to respond more effectively to the oscillations. Another way is to connect a tuned circuit to the ground at two points lying more or less in a meridian passing through the pole E' or, generally stated, to any two points of a different potential.

In Fig. 2 I have shown a device for detecting the presence of the waves such as I have used in a novel method of magnifying feeble effects which I have described in my Patents Nos. 685,953 and 685,955. It consists of a cylinder D, of insulating material, which is moved at a uniform rate of speed by clockwork or other suitable motive power and is provided with two metal rings F F', upon which bear brushes $a$ and $a'$, connected, respectively, to the terminal plates P and P'. From the rings F F' extend narrow metallic segments $s$ and $s'$, which by the rotation of the cylinder D are brought alternately into contact with double brushes $b$ and $b'$, carried by and in contact with conducting-holders $h$ and $h'$, supported in metallic bearings G and G', as shown. The latter are connected to the terminals T and T' of a condenser H, and it should be understood that they are capable of angular displacement as ordinary brush-supports. The object of using two brushes, as $b$ and $b'$, in each of the holders $h$ and $h'$ is to vary at will the duration of the electric contact of the plates P and P' with the terminals T and T', to which is connected a receiving-circuit including a receiver R and a device $d$, performing the duty of closing the receiving-circuit at predetermined intervals of time and discharging the stored energy through the receiver. In the present case this device consists of a cylinder made partly of conducting and partly of insulating material $e$ and $e'$, respectively, which is rotated at the desired rate of speed by any suitable means. The conducting part $e$ is in good electrical connection with the shaft S and is provided with tapering segments $f, f'$, upon which slides a brush $k$, supported on a conducting-rod $l$, capable of longitudinal adjustment in a metallic support $m$. Another brush, $n$, is arranged to bear upon the shaft S, and it will be seen that whenever one of the segments $f'$ comes in contact with the brush $k$ the circuit including the receiver R is completed and the condenser discharged through the same. By an adjustment of the speed or rotation of the cylinder $d$ and a displacement of the brush $k$ along the cylinder the circuit may be made to open and close in as rapid succession and remain open or closed during such intervals of time as may be desired. The plates P and P', through which the electrical energy is conveyed to the brushes $a$ and $a'$, may be at a considerable distance from each other in the ground or one in the ground and the other in the air, preferably at some height. If but one plate is connected to earth and the other maintained at an elevation, the location of the apparatus must be determined with reference to the position of the stationary waves established by the generator, the effect evidently being greatest in a maximum and zero in a nodal region. On the other hand, if both plates be connected to earth the points of connection must be selected with reference to the difference of potential which it is desired to secure, the strongest effect being of course obtained when the plates are at a distance equal to half the wave length.

In illustration of the operation of the system let it be assumed that alternating electrical impulses from the generator are caused to produce stationary waves in the earth, as above described, and that the receiving apparatus is properly located with reference to the position of the nodal and ventral regions of the waves. The speed of rotation of the cylinder D is varied until it is made to turn in synchronism with the alternate impulses of the generator, and the position of the brushes $b$ and $b'$ is adjusted by angular displacement or otherwise, so that they are in contact with the segments S and S' during the periods when the impulses are at or near the maximum of their intensity. These requirements being fulfilled, electrical charges of the same sign will be conveyed to each of the terminals of the condenser, and with each fresh impulse it will be charged to a higher potential. The speed of rotation of the cylinder $d$ being adjustable at will, the energy of any number of separate impulses may thus be accumulated in potential form and discharged through the receiver R upon the brush $k$ coming in contact with one of the segments $f'$. It will be understood that the capacity of the condenser should be such as to allow the storing of a much greater amount of energy than is required for the ordinary operation of the receiver. Since by this method a relatively great amount of energy and in a suitable form may be made available for the operation of a receiver, the latter need not be very sensitive; but when the impulses are very weak or when it is desired to operate a receiver very rapidly any of the well-known sensitive devices capable of responding to very feeble influences may be used in the manner indicated or in other ways. Under the conditions described it is evident that during the continuance of the stationary waves the receiver will be acted upon by current impulses more or less intense, according to its location with reference to the maxima and minima of said waves; but upon interrupting or reducing the flow of the current the stationary waves will disappear or diminish in intensity. Hence a great variety of effects may be produced in a receiver, according to the mode in which the waves are controlled. It is practicable, however, to shift the nodal and ventral regions of the waves at will from the sending-station, as by varying the length of the waves under observance of the above requirements. In this manner the regions of maximum and minimum effect may be made to coincide with any receiving station or stations. By impressing upon the earth two or more oscillations of different wave length a resultant stationary wave may be made to travel slowly over the globe, and thus a great variety of useful effects may be produced. Evidently the course of a vessel may be easily determined without the use of a compass, as by a circuit connected to the earth at two points, for the effect exerted upon the circuit will be greatest when the plates P P' are lying on a meridian passing through ground-plate E' and will be $nil$ when the plates are located at a parallel circle. If the nodal and ventral regions are maintained in fixed positions, the speed of a vessel carrying a receiving apparatus may be exactly computed from observations of the maxima and minima regions successively traversed. This will be understood when it is stated that the projections of all the nodes and loops on the earth's diameter passing through the pole or axis of symmetry of the wave movement are all equal. Hence in any region at the surface the wave length can be ascertained from simple rules of geometry. Conversely, knowing the wave length, the distance from the source can be readily calculated. In like ways the distance of one point from another, the latitude and longitude, the hour, &c., may be determined from the observation of such stationary waves. If several such generators of stationary waves, preferably of different length, were installed in judiciously-selected localities, the entire globe could be subdivided in definite zones of electric activity, and such and other important data could be at once obtained by simple calculation or readings from suitably-graduated instruments. Many other useful applications of my discovery will suggest themselves, and in this respect I do not wish to limit myself. Thus the specific plan herein described of producing the stationary waves might be departed from. For example, the circuit which impresses the powerful oscillations upon the earth might be connected to the latter at two points. In this application I have advanced various improvements in means and methods of producing and utilizing electrical effects which either in connection with my present discovery or independently of the same may be usefully applied.

I desire it to be understood that such novel features as are not herein specifically claimed will form the subjects of subsequent applications.

What I now claim is—

1. The improvement in the art of transmitting electrical energy to a distance which consists in establishing stationary electrical waves in the earth, as set forth.

2. The improvement in the art of transmitting electrical energy to a distance which consists in impressing upon the earth electrical oscillations of such character as to produce stationary electrical waves therein, as set forth.

3. The improvement in the art of transmitting and utilizing electrical energy which consists in establishing stationary electrical waves in the natural conducting media, and operating thereby one or more receiving devices remote from the source of energy, as set forth.

4. The improvement in the art of transmitting and utilizing electrical energy which consists in establishing in the natural conducting media, stationary electrical waves of predetermined length and operating thereby one or more receiving devices remote from the source of energy and properly located with respect to the position of such waves, as herein set forth.

5. The improvement in the art of transmitting and utilizing electrical energy, which consists in establishing in the natural conducting media, stationary electrical waves, and varying the length of such waves, as herein set forth.

6. The improvement in the art of transmitting and utilizing electrical energy, which consists in establishing in the natural conducting media stationary electrical waves and shifting the nodal and ventral regions of these waves, as described.

NIKOLA TESLA.

Witnesses:
M. LAWSON DYER,
BENJAMIN MILLER.